(12) United States Patent
Olson

(10) Patent No.: US 11,490,613 B2
(45) Date of Patent: Nov. 8, 2022

(54) LIGHTED PIG FEED DISPERSAL APPARATUS

(71) Applicant: Harold B. Olson, Billings, MT (US)

(72) Inventor: Harold B. Olson, Billings, MT (US)

( * ) Notice: Subject to any disclaimer, the term of this patent is extended or adjusted under 35 U.S.C. 154(b) by 228 days.

(21) Appl. No.: 17/093,347

(22) Filed: Nov. 9, 2020

(65) Prior Publication Data

US 2022/0142118 A1    May 12, 2022

(51) Int. Cl.
| | | |
|---|---|---|
| *A01M 31/00* | (2006.01) | |
| *A01K 5/02* | (2006.01) | |
| *F21V 21/108* | (2006.01) | |
| *F21V 23/04* | (2006.01) | |
| *F21S 9/03* | (2006.01) | |

(52) U.S. Cl.
CPC ......... *A01M 31/002* (2013.01); *A01K 5/0225* (2013.01); *F21S 9/032* (2013.01); *F21V 21/108* (2013.01); *F21V 23/0471* (2013.01)

(58) Field of Classification Search
CPC .. A01M 31/002; A01M 31/008; A01M 31/00; A01K 5/0225; A01K 5/00; A01K 5/02; F21W 2131/10
See application file for complete search history.

(56) References Cited

U.S. PATENT DOCUMENTS

| | | |
|---|---|---|
| 7,079,027 B2 | 7/2006 | Wojcik |
| 8,555,812 B2 | 10/2013 | Nowacek |
| 8,860,577 B1 | 10/2014 | Chumas et al. |
| 9,380,778 B2 | 7/2016 | Hays |
| 9,560,845 B2 | 2/2017 | Hays |
| 9,629,213 B2 | 4/2017 | Gates |
| 10,076,111 B2 | 9/2018 | Hays |
| 10,080,360 B2 | 9/2018 | Hays |
| 10,130,072 B2 * | 11/2018 | Glover ................. B62D 63/062 |

(Continued)

FOREIGN PATENT DOCUMENTS

| | | | | |
|---|---|---|---|---|
| CN | 108668932 A | * | 10/2018 | ............... A01K 5/02 |
| CN | 110946127 A | * | 4/2020 | .......... A01M 31/008 |
| JP | H080856 A | * | 3/1996 | ............... E04G 5/06 |

OTHER PUBLICATIONS

NPL THH (Screen captures from YouTube video clip entitled "Deer Feeders: How to Build The Ultimate Deer Feeder (on a Sled!)", 2 pages, uploaded Jul. 18, 2017 by user "The Handy Hunter". Retrieved from Internet <https://www.youtube.com/watch?v=Q6vBgDSPzjs>) (Year: 2017).*

*Primary Examiner* — Peter M Poon
*Assistant Examiner* — Carly W. Lynch
(74) *Attorney, Agent, or Firm* — Antoinette M. Tease

(57) ABSTRACT

A lighted pig feed dispersal apparatus having a frame, platform, feeder assembly, feeder light, solar panel, battery, motion sensor lights, arm supports, and extension arms. The frame has four legs, each of which has a distal end and a proximal end, and the proximal end of each leg is attached to the platform. The feeder assembly includes a barrel, and the feeder light is situated underneath the barrel. The solar panel is configured to power the feeder light, and the battery is situated inside of a top part of the barrel. The motion sensor lights extend outwardly from the top part of the barrel. The four arm supports that extend outwardly from a side wall of the barrel and are disposed about a perimeter of the top part of the barrel. The four extension arms are configured to slide onto the four arm supports.

7 Claims, 16 Drawing Sheets

(56) References Cited

U.S. PATENT DOCUMENTS

| | | |
|---|---|---|
| 10,321,545 B2 | 6/2019 | Galas |
| 2005/0237208 A1 | 10/2005 | Wojcik |
| 2008/0190370 A1* | 8/2008 | Coady .................. A01K 5/0225 119/52.1 |
| 2011/0088625 A1 | 4/2011 | Nowacek |
| 2015/0008822 A1 | 1/2015 | Gates |
| 2015/0211720 A1* | 7/2015 | Toner ...................... F21V 33/00 362/183 |
| 2015/0296768 A1 | 10/2015 | Hays |
| 2016/0286787 A1 | 10/2016 | Hays |
| 2017/0079260 A1 | 3/2017 | Hays |
| 2017/0099829 A1 | 4/2017 | Hays |
| 2017/0188440 A1 | 6/2017 | Gates |
| 2018/0279579 A1 | 10/2018 | Alcoser et al. |
| 2018/0332819 A1 | 11/2018 | Michalec |
| 2019/0014742 A1 | 1/2019 | Leggett et al. |

\* cited by examiner

LIGHTED PIG FEED DISPERSAL APPARATUS

BACKGROUND OF THE INVENTION

1. Field of the Invention

The present invention relates generally to the field of pig feeders, and more specifically, to a solar-powered lighted pig feed dispersal apparatus.

2. Description of the Related Art

One of the challenges in hunting feral hogs is backlighting caused by trees, bushes and tall grass that are illuminated from gun- or blind-mounted lights. When the light source moves, the shadows move, which in turn scares the wildlife. Furthermore, lights that are mounted on a blind or a gun are horizontal. With present invention provides vertical lighting, which eliminates side-moving shadows.

Another issue with wild hog hunting is that having to watch the target area all night long is monotonous. With two hunters in a blind, each hunter has to look through his binoculars every two or three minutes to determine whether a pig is in range. Because wild pig hunting is done at night when feral hogs are awake and feeding, if a hunter does not look through his binoculars, he would not be able to see anything, and he would miss the pigs. Moreover, once a feral hog is harvested, the hunter has to locate it in the dark. The only way to accomplish this traditionally has been to go into the brush with headlamps or flashlights to look for the wounded or dead animal.

The present invention solves both of these problems by providing remote controlled and motion-activated lighting around a feed dispersal area. An additional advantage of the present invention is the fact that the invention is self-contained and does not require any additional posts or stakes to be driven into the ground. Although the inventions discussed below pertain generally to the use of motion detectors and illumination methods in connection with various types of feed systems, none of these inventions embodies the unique structural aspects of the present invention.

U.S. Pat. No. 7,079,027 (Wojcik, 2006) discloses an apparatus for detecting motion and providing illumination for use by hunters in monitoring a limited area surrounding a hunting stand in a wooded area. The motion detectors are mounted on trees or other objects surrounding the hunting stand, and a receiver is mounted on the hunting stand. The receiver includes an indicator to alert a hunter when motion has been detected by one of the motion detectors. The receiver also includes at least one light source for illuminated the area around the hunting stand.

U.S. Pat. No. 8,555,812 (Nowacek, 2013) provides a game feeder that is configured for remote monitoring. The game feeder has a feeder body with a container for holding the feed, a monitor configured to disperse the feed, and a motor relay configured to acuate the motor. The invention also comprises a computer that communicates wirelessly with a plurality of sensors on the feeder. The sensors include a rainfall sensor, barometer, camera, thermometer and hydrometer. This particular invention does not incorporate a light.

U.S. Pat. No. 8,860,577 (Chumas et al., 2014) discloses a motion-activated hunting light with a telescoping tripod that includes a plurality of motion sensors that are directed around the tripod in order to form 360 degrees of surveillance. A red light is illuminated whenever one of the motion sensors is activated. After a pre-determined amount of time of illumination of the red light, at least one spotlight illuminates in order to alert a hunter to the presence of a wild game animal. An optional speaker provides an audible alarm or broadcasts sounds to lure animals.

U.S. Pat. No. 9,380,776 (Hays, 2016), U.S. Pat. No. 9,560,845 (Hays, 2017), 10076111 (Hays, 2018) and 10080360 (Hays, 2018) all pertain to a game alert system comprising a device that is mountable on a game feeder to detect motion in a target area. The device automatically sends an electronic signal to a user in a remote location without alerting or startling the animals that triggered the device. In a preferred embodiment, the system includes one or more cameras and/or one or more GPS systems for obtaining photographs and/or video and/or collecting geographic data. The system optionally includes multiple motion sensors and a hub that communicate wirelessly with one another and with a user device.

U.S. Pat. No. 9,629,213 (Gates, 2017) and U.S. Pat. No. 10,321,545 (Gates, 2019) disclose a variably controlled lighting mechanism that is attached to the underside of a hog feeder for use in non-daylight hours to provide selective illumination through more than one color of LED light. The light may include one or more motion sensor. A wireless remote controls various aspect of the light, including illumination of the different LED lights and control of the motor and/or feeder. The light may also be operated manually.

U.S. Patent Application Pub. No. 20180279579 (Alcoser et al.) describes a wildlife baiting assembly for attracting game to a desired location. The assembly includes a cylinder with an open top and bottom. The cylinder is tapered at the bottom to define a cone and a reservoir. The cylinder is elevated above the ground. A solar-powered rechargeable battery is coupled to the cylinder. A feed dispensing unit is configured to broadcast the feed that drops from the cylinder to an area proximate to the base, at specified intervals and for specified lengths of time. This invention does not incorporate any lights.

U.S. Patent Application Pub. No. 20180332819 (Michalec) provides an animal feeder with recessed lighting strips, a recessed solar panel, and a control unit. The animal feeder also has a lid, a cage member, and four legs. The recessed lighting strips are detachably attached to predetermined sections of the animal feeder. The recessed solar panel powers a rechargeable battery in the control unit, which is positioned on an inner surface of the animal feeder for powering the recessed lighting strips. The battery also actuates a supply port for dispensing feed at predefined intervals.

U.S. Patent Application Pub. No. 20190014742 (Leggett et al.) discloses an automated animal feeding system with a container for receiving feed, a sensor, a controller, a communications module that is coupled to the controller, a dispenser for dispensing the feed, and a gate connected to a motor to control the flow of food from the container to the dispenser. The controller is configured to automatically regulate feeding times according to the location of the animal feeding system and the corresponding sunrise and sunset times of the location.

BRIEF SUMMARY OF THE INVENTION

The present invention is a lighted pig feed dispersal apparatus comprising: a frame; a platform; a feeder assembly; a feeder light; a solar panel; a battery; four motion sensor lights; four arm supports; and four extension arms; wherein the frame is comprised of four legs, each of which has a distal end and a proximal end, and wherein the proximal end of each leg is attached to the platform; wherein the feeder assembly is situated in a center of the platform; wherein the feeder assembly comprises a barrel; wherein the feeder light is situated underneath the barrel; wherein the solar panel is configured to power the feeder light; wherein the battery is situated inside of a top part of the barrel; wherein the motion sensor lights extend outwardly from the top part of the barrel; wherein the four arm supports that extend outwardly from a side wall of the barrel and are disposed about a perimeter of the top part of the barrel; and wherein the four extension arms are configured to slide onto the four arm supports.

In a preferred embodiment, the platform is rectangular in shape; wherein the four legs are arranged in two pairs, with one pair of legs on a right-hand side of the platform and another pair of legs on a let-hand side of the platform; and wherein each pair of legs is joined by a plurality of horizontal connecting members. Preferably, a ladder is pivotally attached to a center part of a lowest of the plurality of horizontal connecting members on at least one side of the apparatus. The platform is preferably divided into thirds laterally, with a flat metal mesh material covering the outermost two-thirds of the platform and a center third of the platform being open.

In a preferred embodiment, the invention further comprises a wind sock that extends upwardly from the barrel cover. Preferably, each of the four motion sensor lights is contained within a housing that also contains a D cell battery that is configured to power the motion sensor light. Each of the four motion sensor lights is preferably pivotally attached to a distal end of one of the four extension arms and configured to be tilted upward or downward.

In a preferred embodiment, the invention further comprises a framework that is situated on top of the barrel cover and configured to support a remote-controlled light; and a remote-controlled light that sits on top of the framework; wherein the remote-controlled light is configured to be powered by the battery. Preferably, the invention further comprises a barrel cover that is removably secured to a top of the barrel; and a waterproof cover that is situated inside of the barrel directly underneath the barrel cover and over the battery; wherein the waterproof cover covers only half of an interior lateral surface of the barrel, extending from a central lateral axis of the barrel to an inside perimeter of the barrel.

In a preferred embodiment, the invention further comprises an interior framework; wherein the interior framework comprises an upper interior framework and a lower interior framework; wherein the upper interior framework is comprised of a first arm, a second arm, a third arm, a fourth arm, a fifth arm, a sixth arm, a seventh arm, and an eight arm, each of which has a distal end and a proximal end; wherein the proximal ends of the first and second arms are joined to a center post that extends vertically from a bottom of the interior framework to a top of the interior framework; wherein the first and second arms extend upwardly from the center post at a first angle, pass through the side wall of the barrel, and become the first and second arm supports; wherein the third and fourth arms extend upwardly from the center post at a second angle and terminate at the side wall of the barrel; wherein the distal end of the third arm is joined to the proximal end of the fifth arm, and the distal end of the fourth arm is joined to the proximal end of the sixth arm; wherein the fifth arm extends from the distal end of the third arm at a third angle, and the sixth arm extends from the distal end of the fourth arm at the third angle; wherein the distal end of the fifth arm is joined to the proximal end of the seventh arm, and the distal end of the sixth arm is joined to the proximal end of the eighth arm; and wherein the seventh arm extends from the distal end of the fifth arm at a fourth angle, passes through the side wall of the barrel, and becomes the third arm support, and wherein the eighth arm extends from the distal end of the sixth arm at the fourth angle, passes through the side wall of the barrel, and becomes the fourth arm support; wherein the lower interior framework comprises a ninth arm, a tenth arm, and an eleventh arm, each of which has a proximal end and a distal end, and each of which is disposed radially about the center post, with a proximal end of each of the ninth, tenth and eleventh arms joined to the center post; wherein the ninth, tenth and eleventh arms extend outwardly from the center post at an angle that is equal to the first angle of the upper interior framework; and wherein the distal ends of the ninth, tenth and eleventh arm is terminate at an interior of the side wall of the barrel; and wherein the lower interior framework is situated below the upper interior framework.

In a preferred embodiment, the first angle is approximately twenty degrees. In the same preferred embodiment, the first angle is equal to the sum of the second, third and fourth angles. In the same preferred embodiment, the fifth and sixth arms are situated on either side of the battery. In the same preferred embodiment, the entire interior framework is situated in a top one-third of the interior of the barrel. The battery is preferably situated on a battery platform, and the battery platform is situated between the tipper and lower interior frameworks.

In a preferred embodiment, the first and second arms are disposed about the center post with ninety degrees between them measured from a top perspective view; wherein there is a ninety-degree angle between the first and seventh arms relative to the center post measured from a top perspective view; wherein there is a ninety-degree angle between the second and eighth arms relative to the center post measured from a top perspective view; wherein there is a forty-five-degree angle between the first arm and the third arm relative to the center post measured from atop perspective view; wherein there is a forty-five-degree angle between the second arm and the fourth arm relative to the center post measured from a top perspective view; and wherein the ninth, tenth and eleventh arms are evenly disposed about the center post with one hundred twenty degrees between them relative to the center post measured from a top perspective view.

REFERENCE NUMBERS

Figure 1:
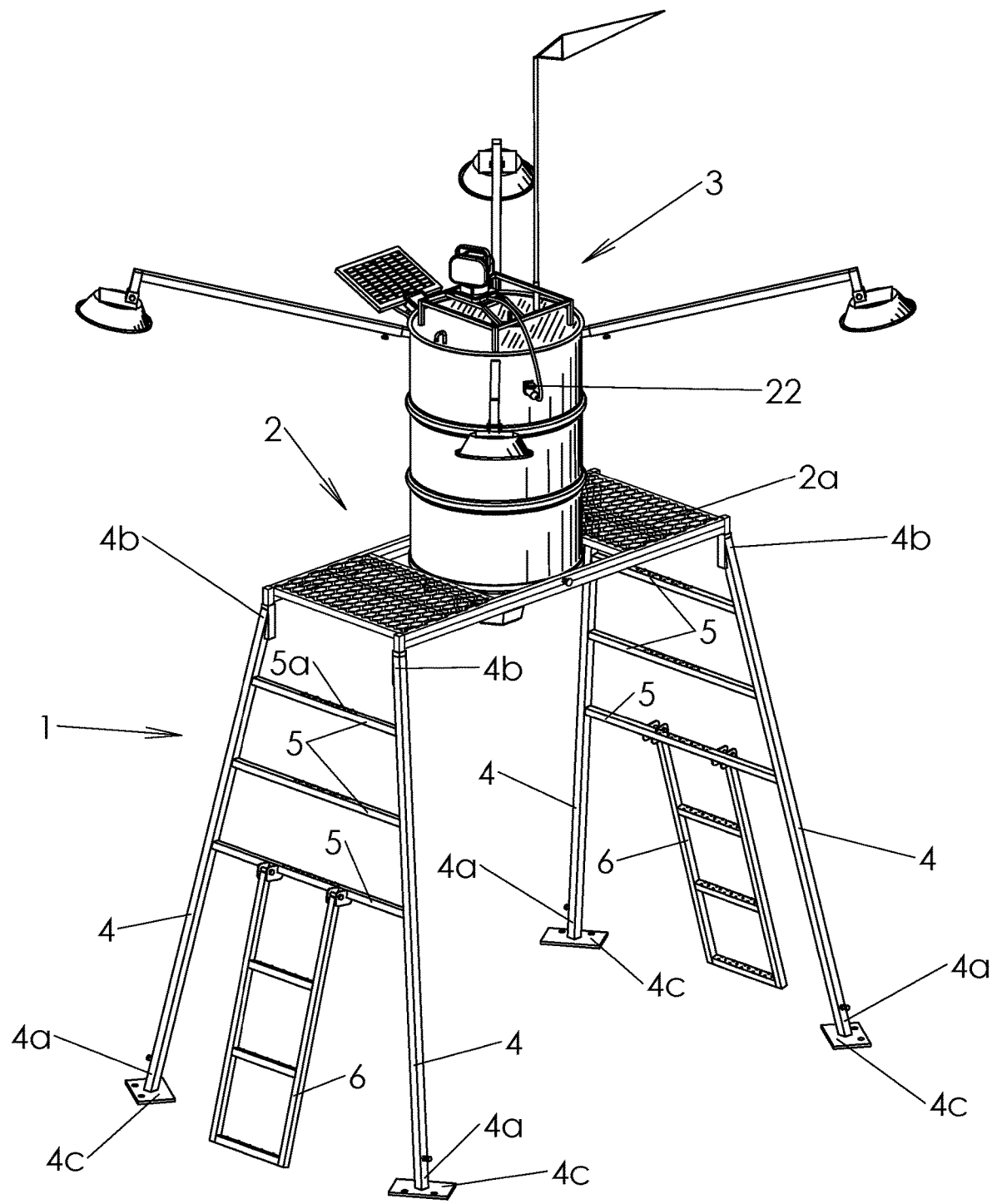
FIG. 1 is a top perspective view of the invention.

1 Frame
2 Platform
2a Metal mesh material
2b Longitudinal member
2c Lateral member
2d Horizontal supporting member
3 Feeder assembly
4 Leg
4a Distal end (of leg)
4b Proximal end (of leg)
5 Horizontal connecting member
5a Gripping surface
6 Ladder
7 Feeder
8 Barrel
8a Barrel cover
9 Feeder light
10 Primary solar panel
10a Bracket
10b Pivot point
11 Controller
12 Battery
13 Conduit
14 Wind sock
15 Motion sensor light
15a Light housing
16 Extension arm
16a Pivot point
17 Lock
18 Framework
19 Remote-controlled light
20 First battery vent
21 Second battery vent
22 Electrical plug
23 Protrusion
24 Set screw
25 Adjustable voltage regulator
26 Arm support
26a Weld (on arm support)
27 Secondary solar panel
28 Waterproof cover
28a Cutout (in waterproof cover)
29 Battery platform
30 First arm
31 Second arm
32 Third arm
33 Fourth arm
34 Fifth arm
35 Sixth arm
36 Seventh arm
37 Eighth arm
38 Center post
39 Bolt
40 Ninth arm
41 Tenth arm
42 Eleventh arm
43 Lip
44 Platform support bar

DETAILED DESCRIPTION OF INVENTION

FIG. 1 is a top perspective view of the invention. As shown in this figure, the present invention is comprised of a frame 1, a platform 2, and a feeder assembly 3. The frame 1 is comprised of four legs 4, each of which has a distal end 4a and proximal end 4b. The proximal ends 4b of the legs 4 are attached to the four corners of the platform 2. The legs 4 are configured so that they splay outward from the platform 2, and the distal ends 4a of the legs 4 are supported by the ground. Each distal end 4a preferably terminates in a foot 4c, which is in the form of a plate that lies flat upon the ground.

The platform 2 is preferably rectangular in shape so that the legs 4 are arranged in pairs, with one pair of legs ort the right-hand side of the platform and another pair of legs on the let-hand side of the platform. Each pair of legs 4 is joined by a plurality of horizontal connecting members 5, each of which spans the width from one leg in the pair of legs to the other leg in the pair of legs. In a preferred embodiment, there are three horizontal connecting members. A ladder 6 is pivotally attached to the center part of lowest of the plurality of horizontal connecting members 5 on at least one side of the invention (as shown in the figures, there is a ladder on both sides of the invention) such that when the ladder 6 is in a downward position, as shown, it extends downwardly between the bottom portions of each of the two legs 4 in the pair of legs. Each of the horizontal connecting members 5 preferably comprises a gripping surface 5a to prevent slipping when a person climbs up onto the platform 2.

The platform 2 is preferably comprised of a flat metal mesh material 2a, suitable for standing on. The platform 2 is divided approximately into thirds, with the metal mesh material 2a extending across the two outer-most thirds of the platform 2, as shown. The feeder assembly is situated in the center third of the platform 2 and extends upwardly from the center of the platform. The perimeter of the platform 2 is comprised of two longitudinal members 2b and two lateral members 2c that are connected together to form a rectangle, as shown. The metal mesh material 2a is supported by a plurality of horizontal supporting members 2d that extend laterally from one of the longitudinal members to the other longitudinal member. In a preferred embodiment, there are four horizontal supporting member 2c, with two horizontal supporting members 2c on either side of the barrel 8.

Figure 2:
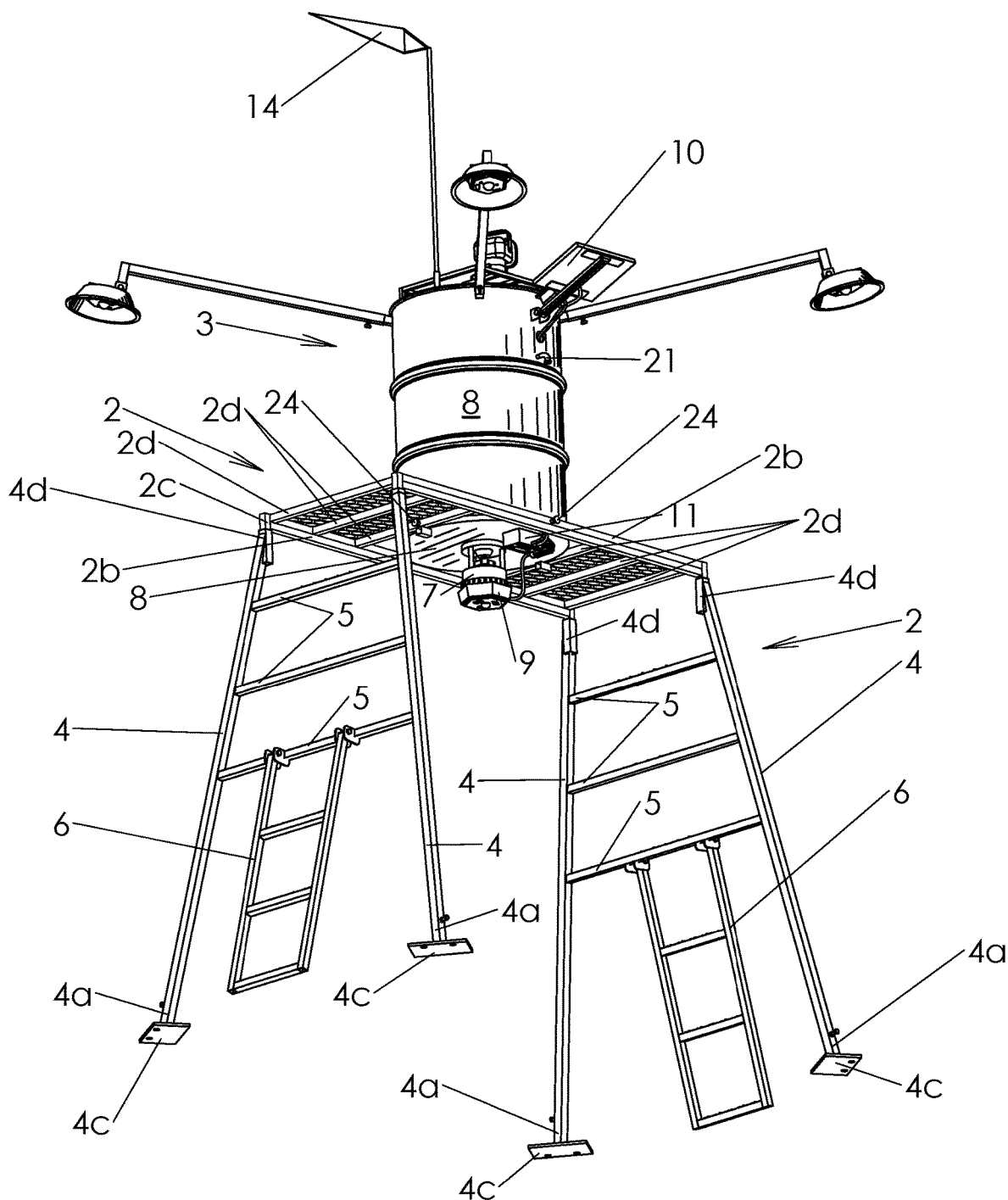
FIG. 2 is a bottom perspective view of the invention.

FIG. 2 is a bottom perspective view of the invention. As shown in this figure, a feeder 7 is situated directly underneath the barrel 8 of the feeder assembly 3. Any type of commercially suitable feeder 7 may be used; one example of such a feeder is the Moultrie All-in-One Deer Feeder Timer Kit manufactured by Plastic Research and Development Corporation d/b/a Pradco of Birmingham, Ala. The barrel 8 contains dry feed, which falls by gravity through a hole (not shown) in the bottom of the barrel 8 and into the feeder 7. The feeder 7 then disperses the feed onto the ground underneath the platform 2. Directly underneath the feeder 7 is a feeder light 9, which may be set to a dusk/dawn setting so that it only comes on at night. The feeder 7 and feeder light 9 are powered by the primary solar panel 10 extending outwardly from the top part of the barrel 8. The primary solar panel 10 transmits power to a controller 11 that is preferably situated on the underside of the barrel 8, as shown. In this manner, the operator can easily view the controller 11 to assess the charge level of the battery 12 (see FIG. 9). The controller 11 transmits power to the battery 12, which is located inside of the top part of the barrel 8 (see FIGS. 9 and 10). The electrical cables (not shown) from the primary solar panel 10 to the controller 11 and from the controller 11 to the battery 12 run through a conduit 13 that extends vertically along the side of the barrel 8 from the top of the barrel to the bottom of the barrel (see FIG. 10). The feeder 7 and feeder light 9 are both powered by the battery 12. The power cords from the battery 12 to the feeder and feeder light are also encased within the conduit 13. The feeder light 9 is preferably situated about six feet off the ground and emits light in a 30-foot radius.

Figure 3:
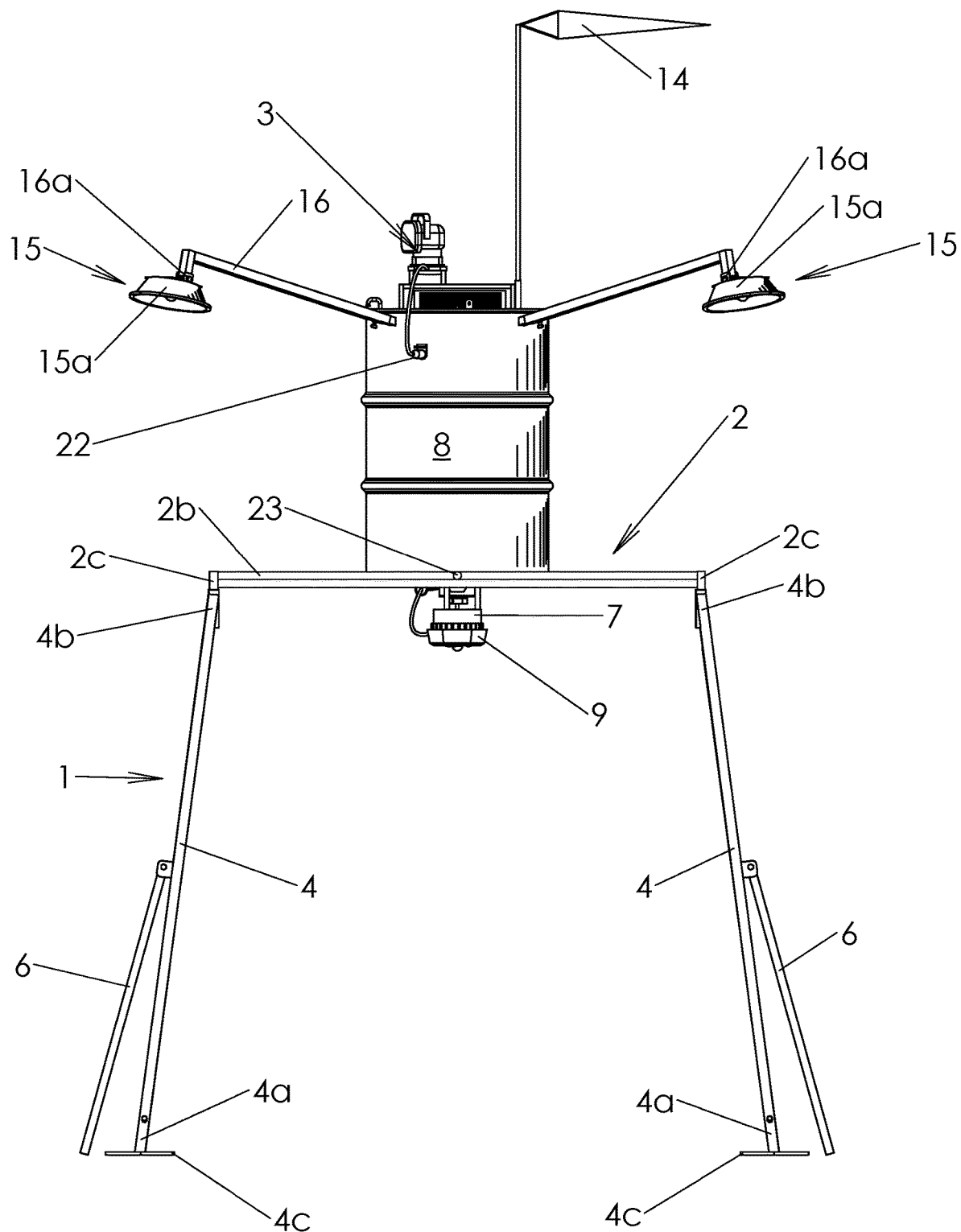
FIG. 3 is a side view of the invention.

FIG. 3 is a side view of the invention. As shown in this figure, the invention preferably comprises a wind sock 14 extending upwardly from the barrel cover 8a and four motion sensor lights 15 that extend outwardly from the top part of the barrel 8 at an angle (the specific angles are discussed in connection with subsequent figures). The motion sensor lights 15 are preferably powered by D batteries (not shown) that are contained within the light housing 15a. Each motion sensor light 15 is pivotally attached to an extension arm 16 at pivot point 16a so that the motion sensor light 15 can be tilted upward or downward to illuminate the desired area.

Figure 4:
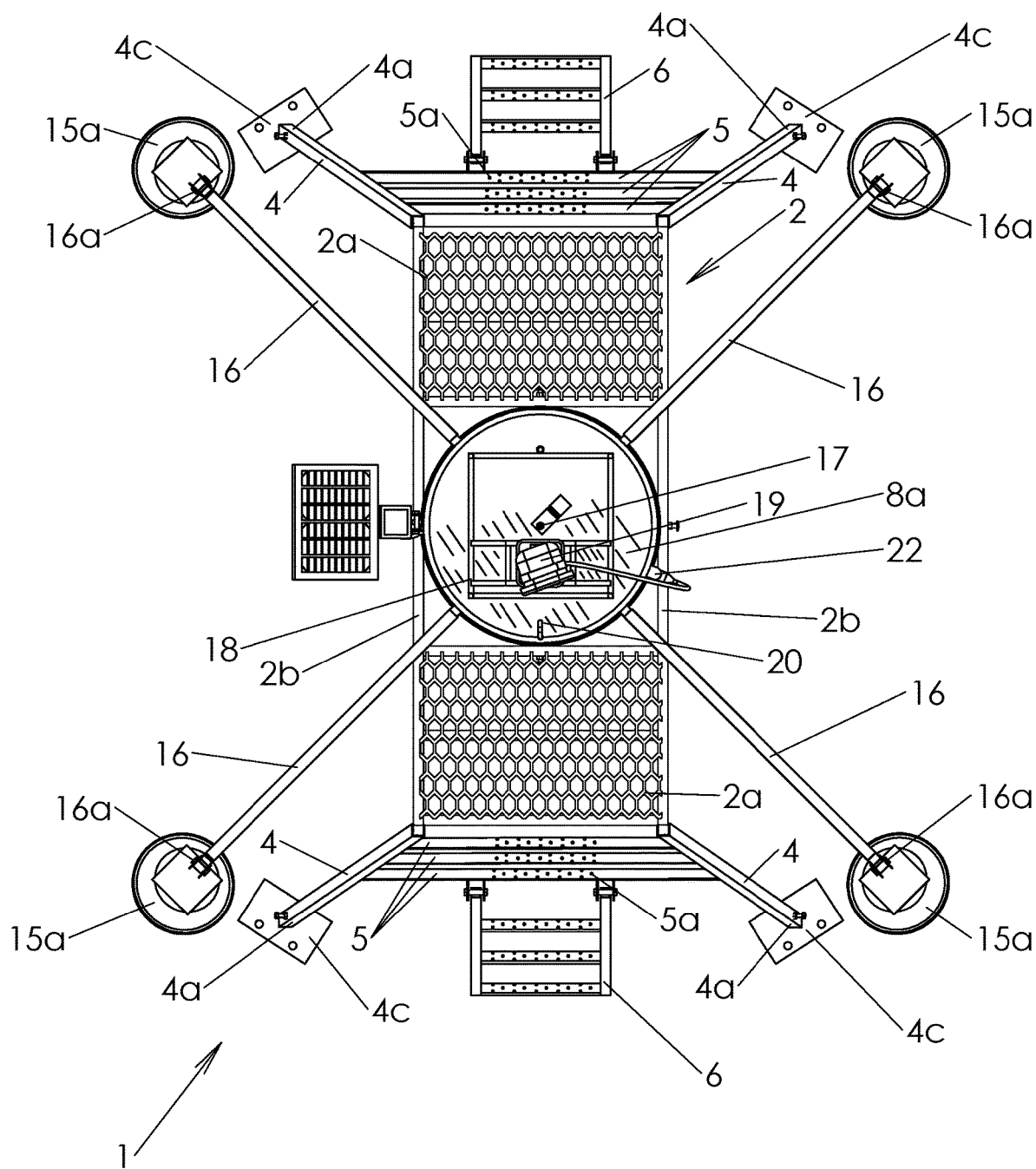
FIG. 4 is a top view of the present invention. The wind sock has been omitted for clarity.

FIG. 4 is a top view of the present invention. The wind sock has been omitted for clarity. As shown in this figure, the barrel cover 8a is secured to the barrel with a lock 17 that is preferably configured to receive a padlock (not shown). This figure also shows the framework 18 situated on top of the barrel cover 8a. This framework 18 supports a remote-controlled light 19 that can be turned on or off remotely by the operator. The remote-controlled light 19 is powered by the battery 12. A first battery vent 20 is situated on the barrel cover 8a directly above the battery 12 (see FIG. 9). A second battery vent 21 is located on the side of the top pan of the exterior of the barrel 8 (see FIG. 2). The electrical plug 22 for the remote-controlled light 19 is also situated on the top part of the exterior of the barrel 8 proximate to the light.

Figure 5:
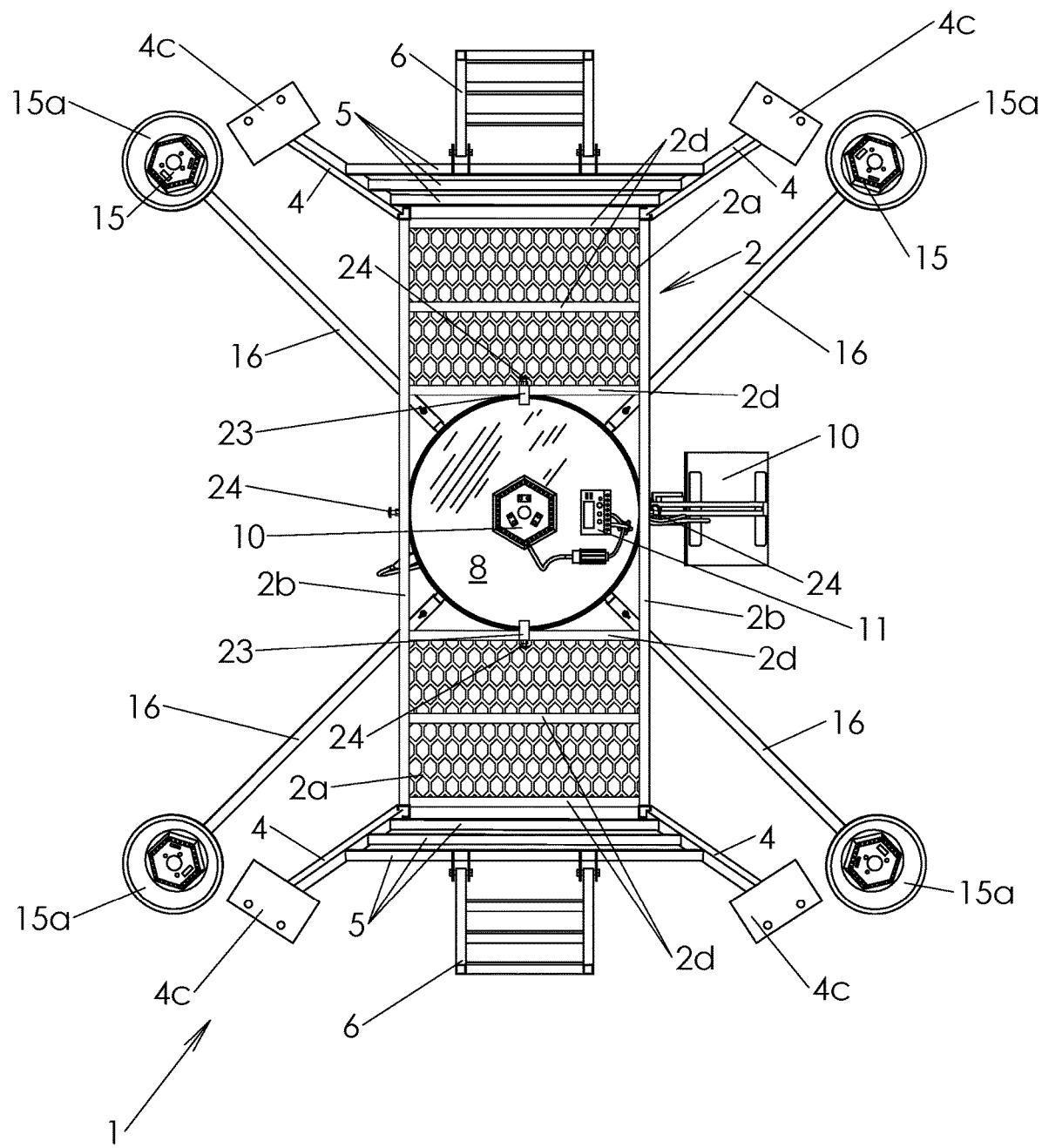
FIG. 5 is a bottom view of the present invention.

FIG. 5 is a bottom view of the present invention. As shown in this figure, the bottom of the barrel is supported by the longitudinal members 2b, as well as protrusions 23 extending toward the center of the platform from the innermost horizontal supporting members 2d. Set screws 24 hold the barrel in position on the longitudinal members 2b. An adjustable voltage regulator 25 converts the 12-volt charge from the battery 12 to the required power input for the feeder light 9. In a preferred embodiment, the voltage on the remote-controlled light is 12 volts, the voltage on each of the motion sensor lights 15 is six volts, and the voltage on the feeder/feeder light 7, 9 is either six or 12 volts.

Figure 6:
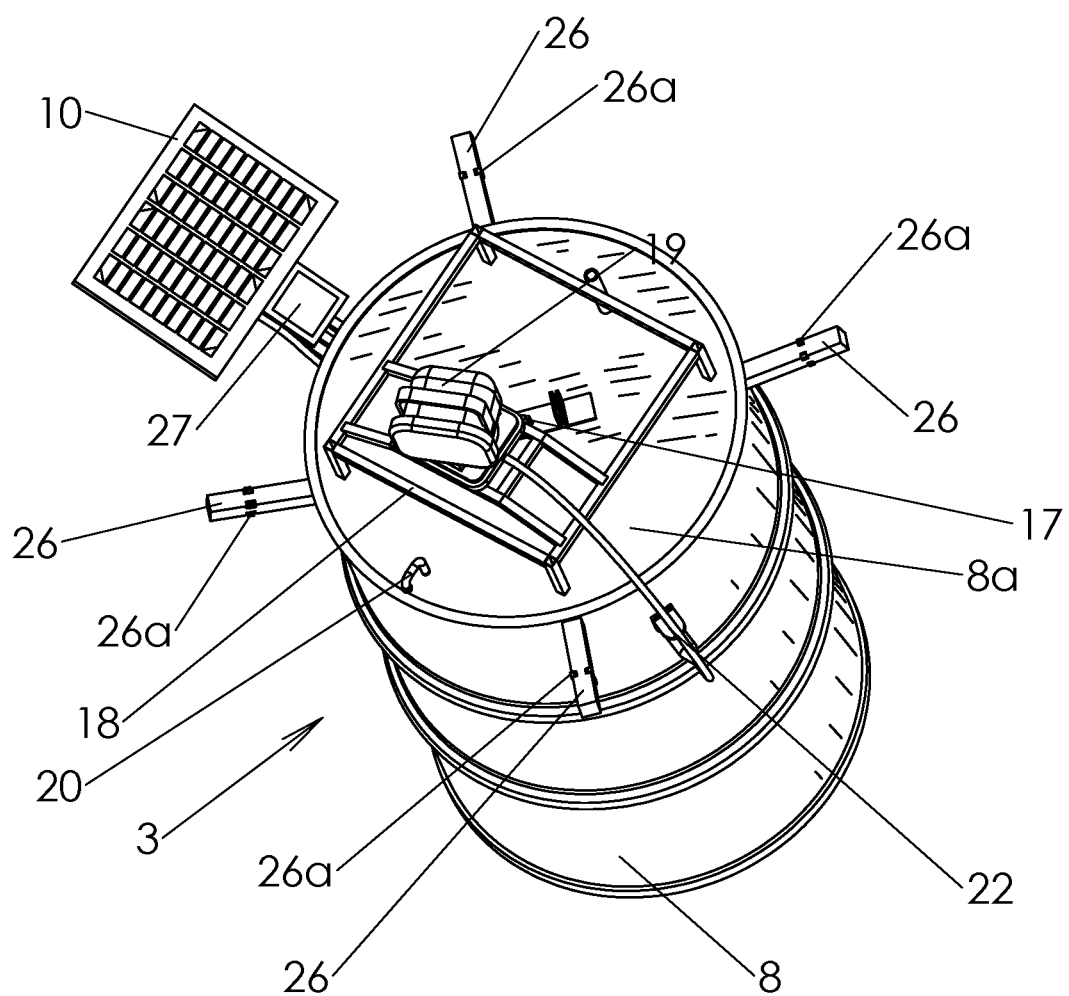
FIG. 6 is a top perspective view of the feeder assembly of the present invention.

FIG. 6 is a top perspective view of the feeder assembly of the present invention. As shown in this figure, four arm supports 26 extend outwardly from the side wall of the top part of the barrel 8. The extension arms 16 described above slide onto these arm supports 26, and welds 26a on the arm supports 26 help ensure that there is a tight fit between the extension arms 16 and the arm supports 26. The distal ends of the arm supports 26 are preferably capped (sealed) so as to prevent dirt and debris from entering the interior of the barrel 8 though the arm supports 26a. This figure also shows an optional secondary solar panel 27, which may be used to operate the feeder light 9. Alternately, the feeder light 9 may be powered from the primary solar panel 10 using the adjustable voltage regulator 25 discussed above.

Figure 7:
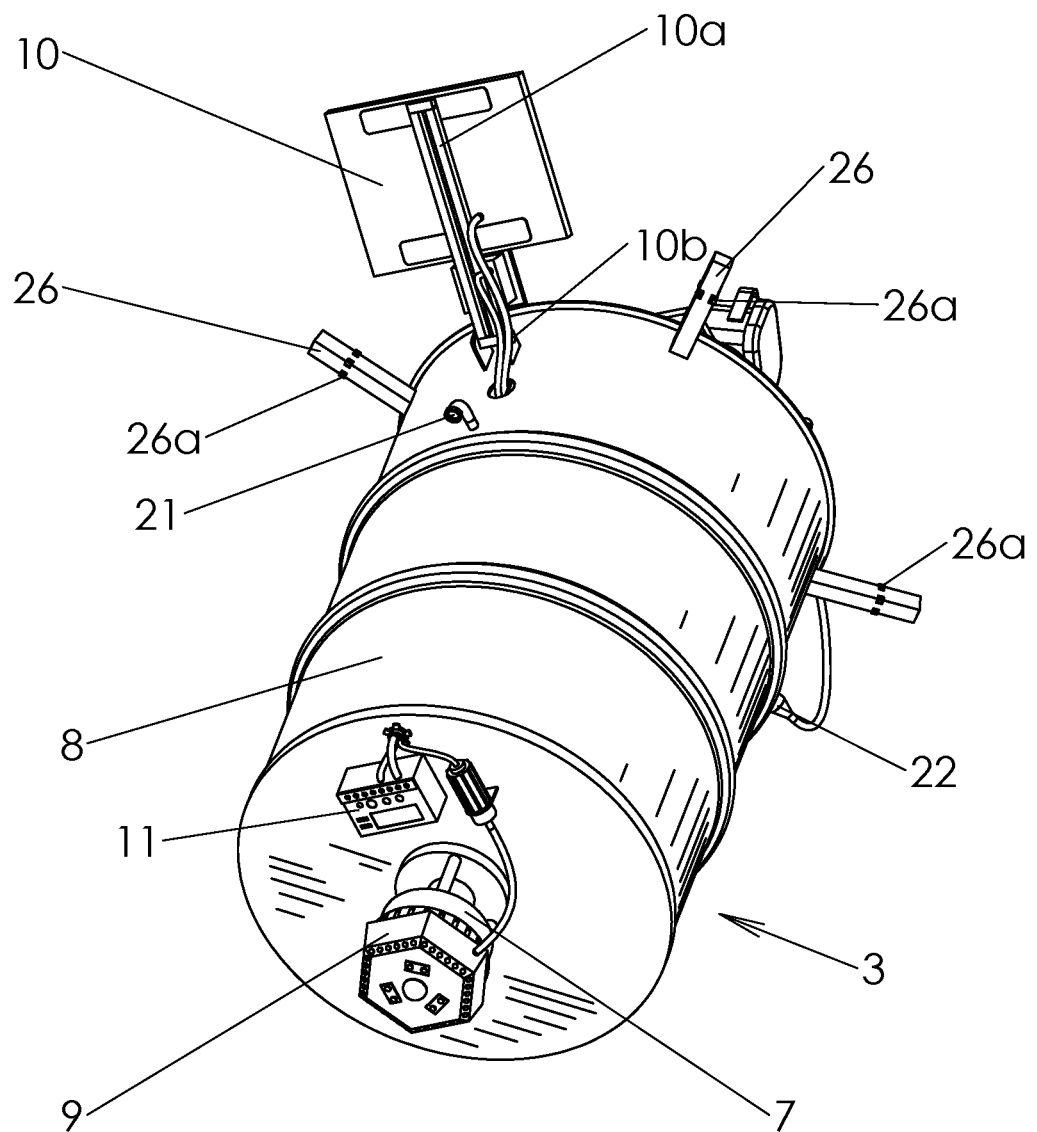
FIG. 7 is a bottom perspective view of the feeder assembly of the present invention.

FIG. 7 is a bottom perspective view of the feeder assembly of the present invention. The primary (and, if applicable, secondary) solar panel 10 is supported by a bracket 10a that is pivotally connected to the barrel 8 via pivot point 10b. In this manner, the primary solar panel 10 may be tilted as needed to optimize the capture of solar energy or pivoted downward to avoid hail damage to the photovoltaic cells. All other parts shown in this figure have been previously described.

Figure 8:
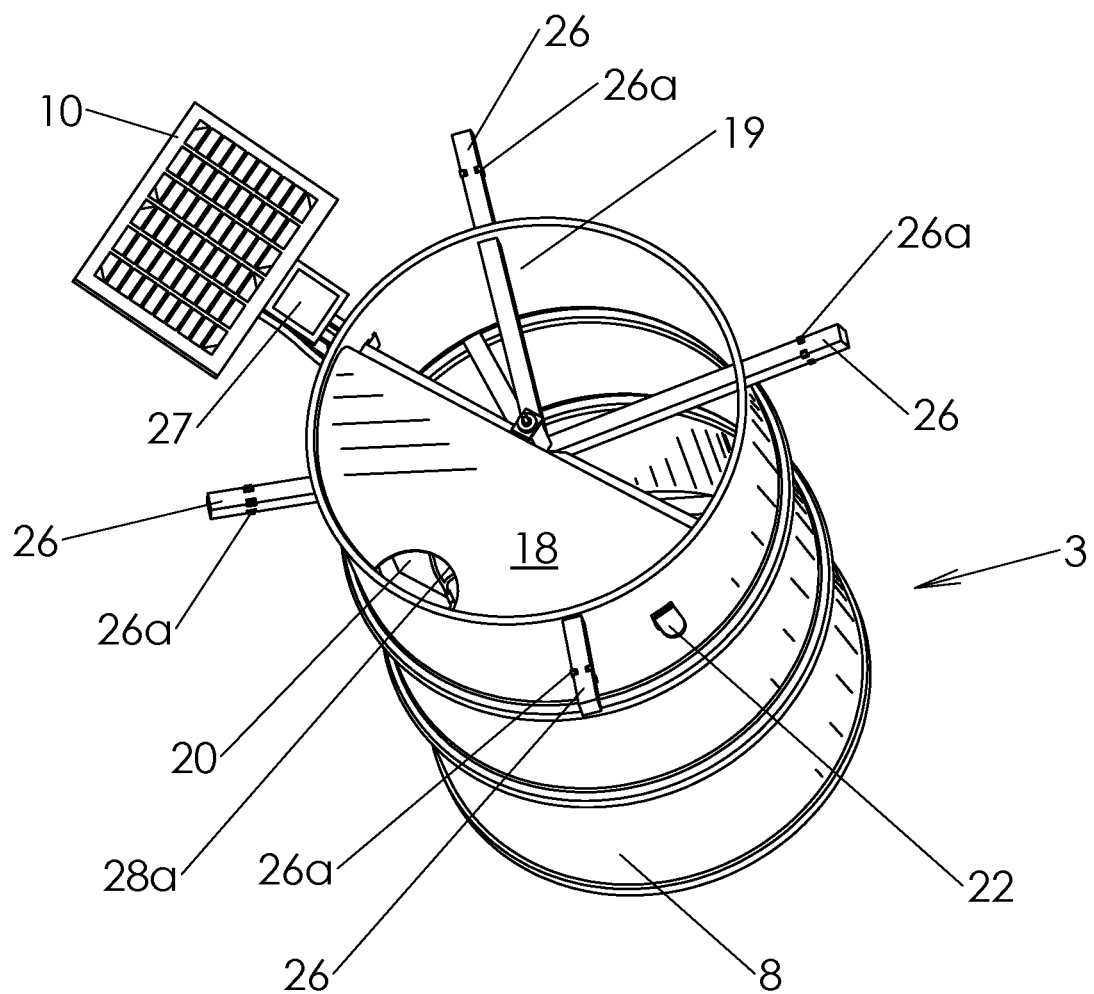
FIG. 8 is a top perspective view of the feeder assembly of the present invention shown with the lid removed.

FIG. 8 is a top perspective view of the feeder assembly of the present invention shown with the lid removed. As used herein, the term "lid" means the barrel cover 8a. As shown in this figure, A flexible, waterproof cover 28 is situated inside of the barrel 8 directly underneath the barrel cover 8a and over the battery 12. The waterproof cover 28 comprises a cutout 28a that is situated proximate to the first battery vent 20 to allow gas to travel from the battery compartment (defined by the space underneath the waterproof cover and above the battery platform 29) through the cutout 28a and out the vent 20. Note that the waterproof cover 28 covers only half of the interior lateral surface of the barrel, extending from a central lateral axis of the barrel to the inside perimeter of the barrel.

Figure 9:
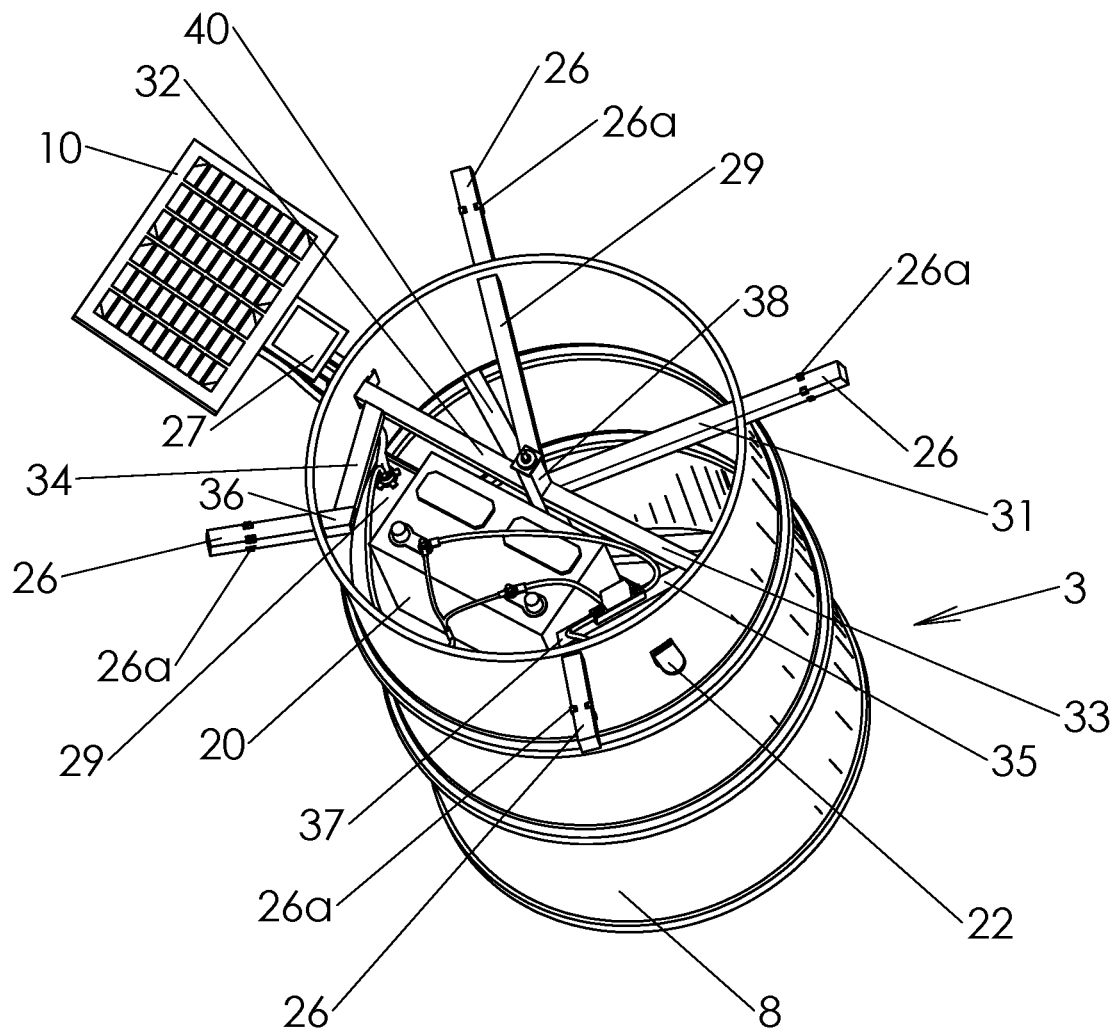
FIG. 9 is a first top perspective view of the feeder assembly of the present invention shown with the lid and waterproof cover removed.
Figure 10:
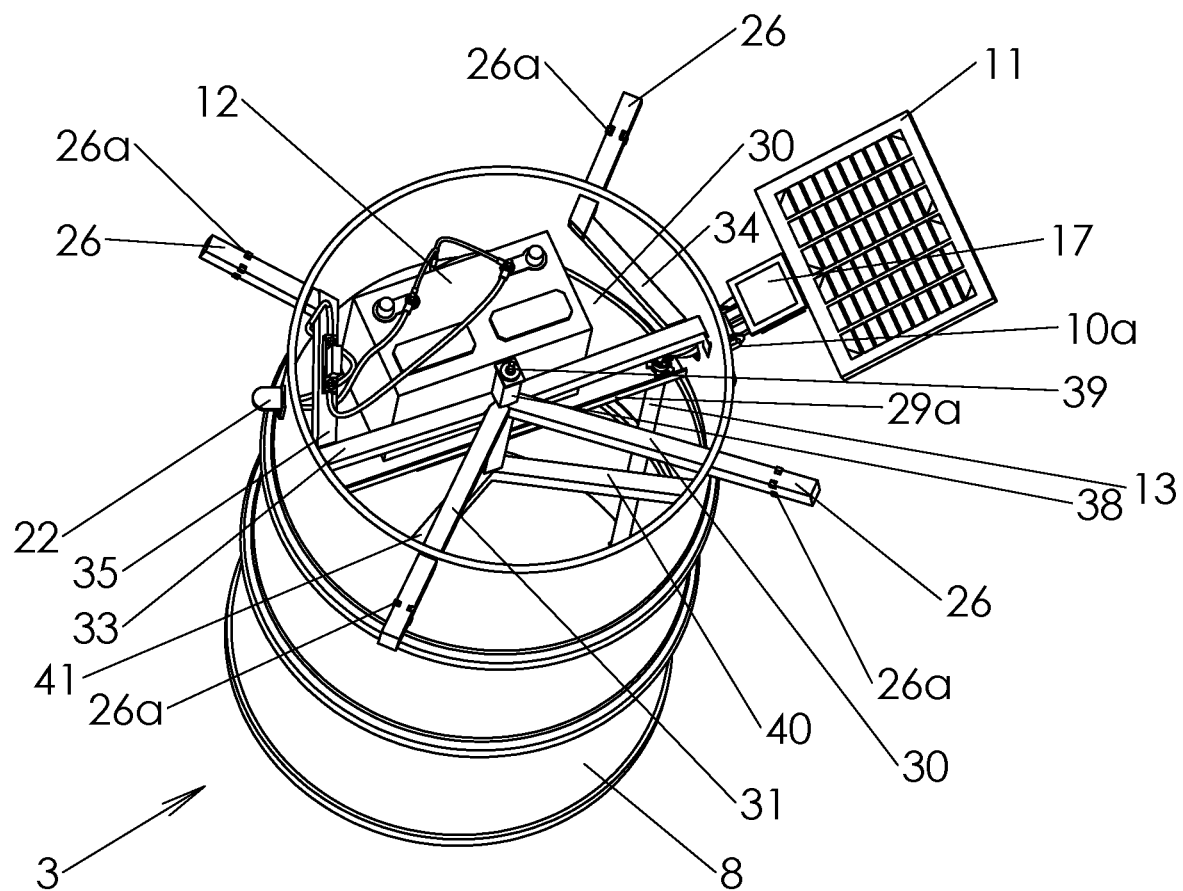
FIG. 10 is a second top perspective view of the feeder assembly of the present invention shown with the lid and waterproof cover removed.

FIG. 9 is a first top perspective view of the feeder assembly of the present invention shown with the lid and waterproof cover removed, and FIG. 10 is a second top perspective view of the feeder assembly of the present invention shown with the lid and waterproof cover removed. As shown in these two figures, the invention comprises an interior framework that is designed to accomplish three purposes. First, the interior framework supports the battery 12. Second, it supports the arm supports 26 and, by extension, the arm extensions 16. Third, it provides structural support to the interior of the barrel 8 itself.

As shown in FIGS. 9 and 10, the interior framework comprises an upper interior framework and a lower interior framework. The upper interior framework is comprised of a first arm 30, a second arm 31, a third arm 32, a fourth arm 33, a fifth arm 34, a sixth arm 35, a seventh arm 26 and an eighth arm 27. Each of these arms has a distal end and a proximal end. The proximal ends of the first and second arms 30, 31 are joined to the center post 38, which extends vertically from the bottom of the interior framework to the top of the interior framework. Note that the entire interior framework is situated in the top third of the interior of the barrel 8. The first and second arms 30, 31 extend upwardly from the center post 38 at a first angle, pass through the wall of the barrel, and become the arm supports 26a for two of the motion sensor lights 15. In a preferred embodiment, the first angle is approximately twenty degrees (20°).

The third and fourth arms 32, 33 extend upwardly from the center post 38 at a second angle and terminate at the wall of the barrel. The distal ends of the third and fourth arms 32, 33 are joined to the proximal ends of the fifth and sixth arms 34, 35, respectively. The fifth and sixth arms 32, 33 extend firm the distal ends of the third and fourth arms 32, 33 at a third angle. The distal ends of the fifth and sixth arms 34, 35 are joined to the proximal ends of the seventh and eighth arms 36, 37. The seventh and eighth arms 36, 37 extends from the distal ends of the fifth and sixth arms 34, 35 at a fourth angle, pass through the wall of the barrel, and become the arm supports 26a for the other two motion sensor lights 15. In a preferred embodiment, the first angle is equal to the sum of the second, third and fourth angles. Note that the fifth and sixth arms 34, 35 are situated on either side of the battery 12. A threaded bolt 39 extends through the center of the barrel cover 8a, and the lock 17 has a threaded portion that screws onto the bolt 38 to secure the cover 8a onto the barrel 8.

The lower interior framework is comprised of a ninth arm 40, a tenth arm 41, and an eleventh arm 42. The ninth, tenth and eleventh arms are disposed radially about the center post 38 with the proximal end of each of the ninth, tenth and eleventh arms 40, 41, 42 joined to the center post 38. The ninth, tenth and elevenths arms 40, 41, 42 extend outwardly from the center post 38 at an angle that is equal to the first angle of the upper interior framework. The distal ends of the ninth, tenth and elevenths arms 40, 41, 42 terminate at the interior wall of the barrel. The lower interior framework is situated below the upper interior framework. The battery 12 sits on a battery platform 29, which is situated between the upper and lower interior frameworks. The battery platform 29 extends horizontally across the inside of the barrel, extending from the central lateral axis of the barrel to the inside perimeter of the barrel. The battery platform 29 is welded to the interior walls of the barrel 8 and preferably comprises a lip 43 along the edge of the battery platform that is situated along the central lateral axis of the barrel (referred to as the "proximal edge" of the battery platform). A platform support bar 44 is preferably welded to the bottom of the battery platform, along at least part of the proximal edge of the battery platform. In terms of structural stability, the lower interior framework compensates for any upward pressure that might be placed on the center pot 38 as a result of the weight of the motion sensor lights 15 on the extension arms 16. FIG. 10 also shows the electrical conduit 13.

Figure 11A:
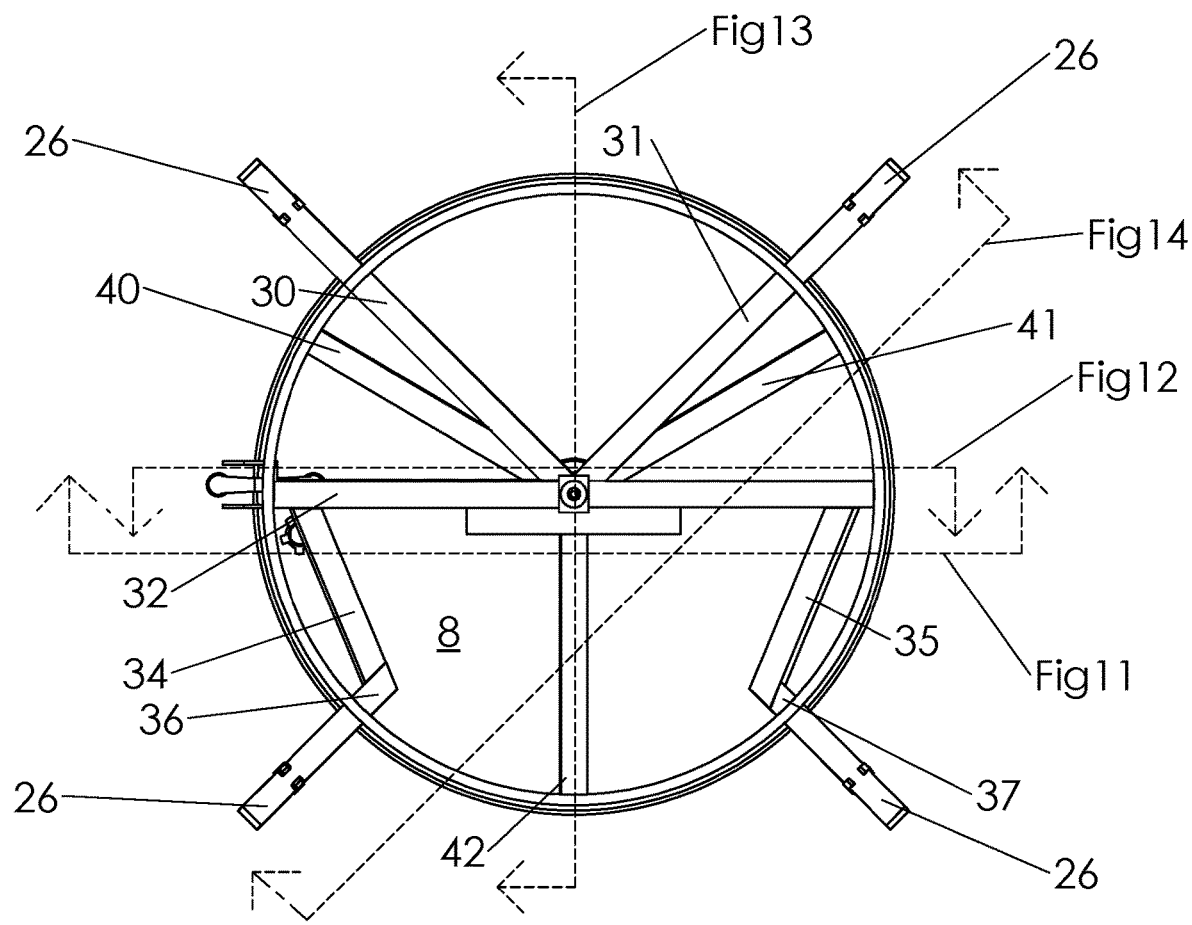
FIG. 11A is a first top view of the feeder assembly of the present invention shown with the lid, waterproof cover, battery and battery platform removed. The primary solar panel has also been removed from this figure for clarity.
Figure 11B:
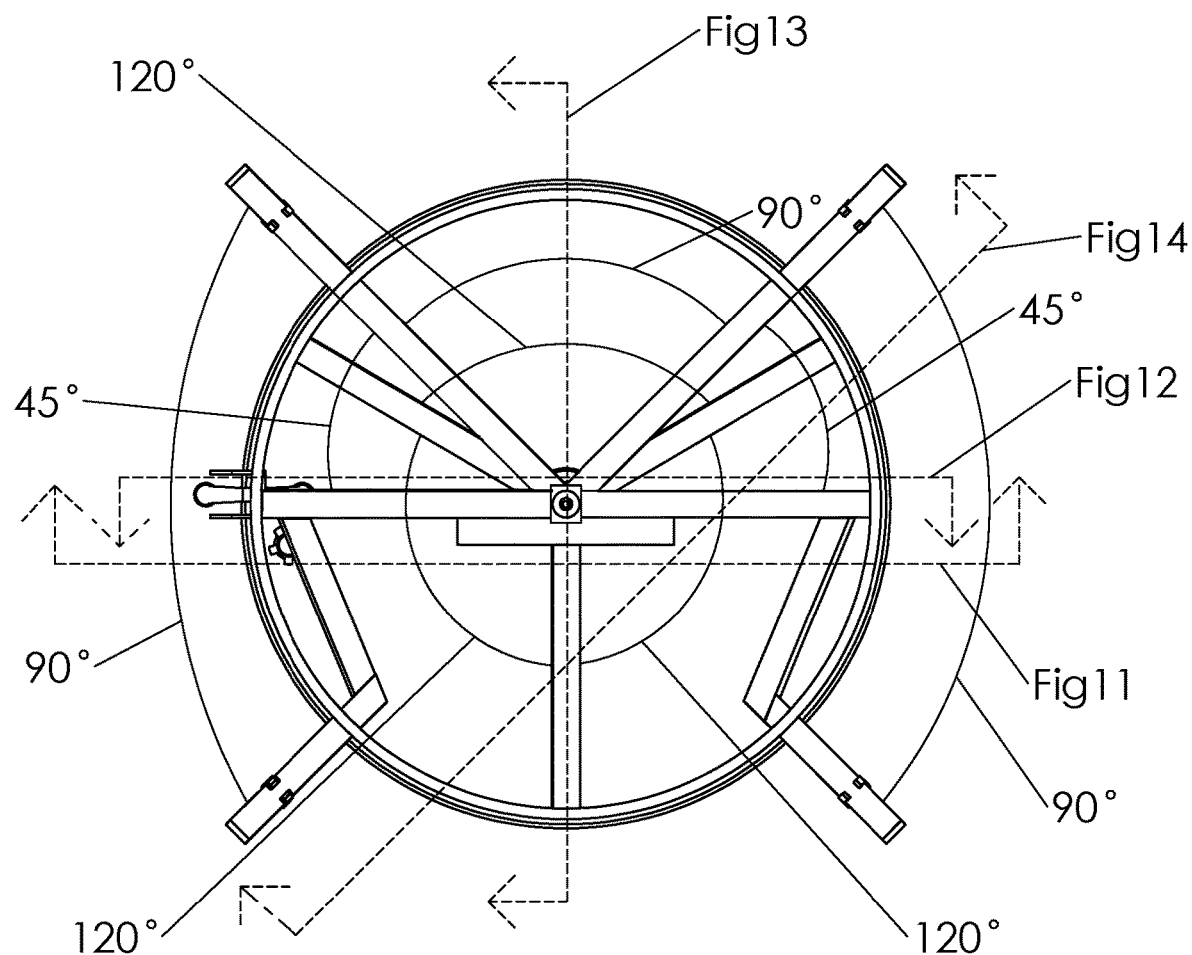
FIG. 11B is a second top view of the feeder assembly of the present invention shown with the lid, waterproof cover, battery and battery platform removed. The primary solar panel has also been removed from this figure for clarity.
Figure 12:
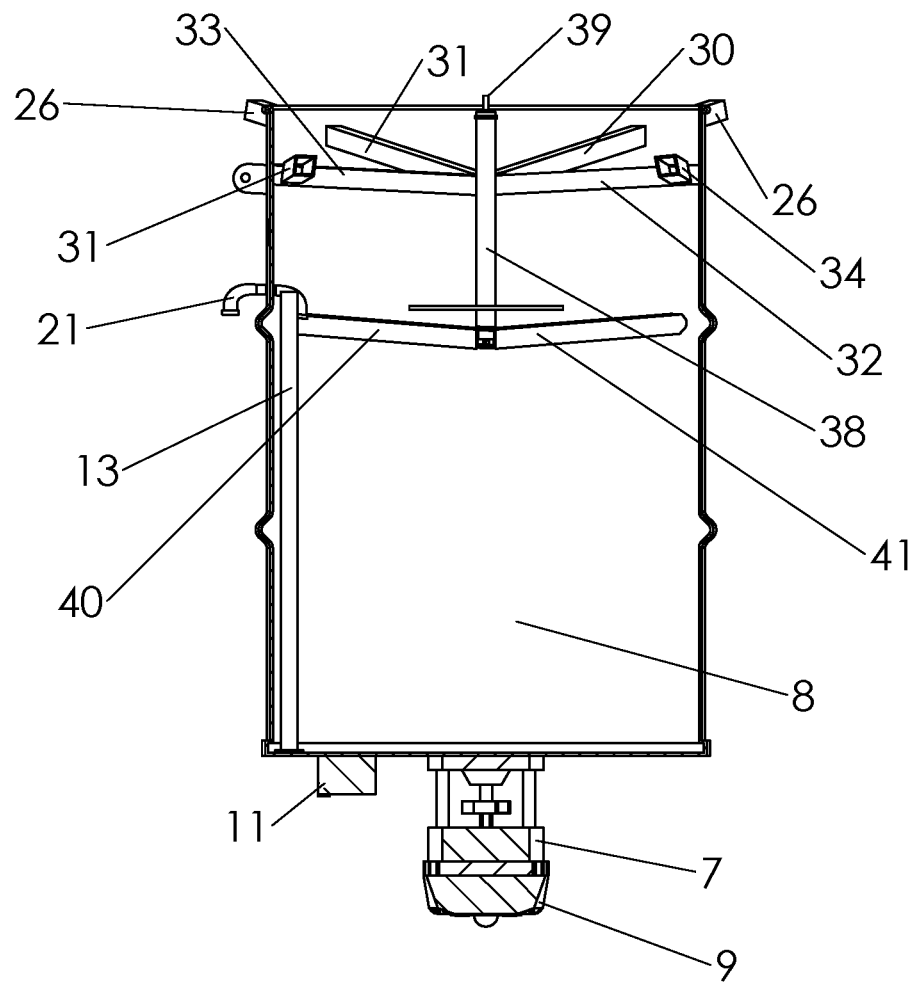
FIG. 12 is a section view of the feeder assembly of the present invention taken from the section line shown in FIG. 11.
Figure 13:
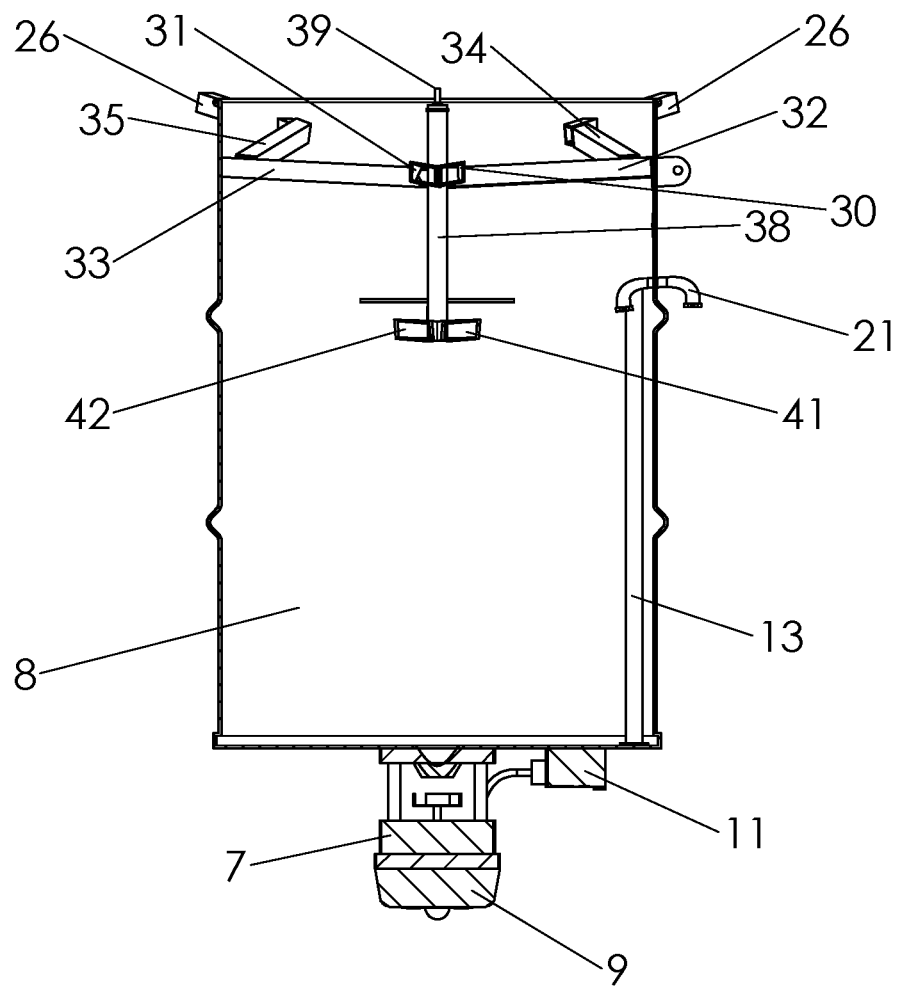
FIG. 13 is a section view of the feeder assembly of the present invention taken from the section line shown in FIG. 11.
Figure 14:
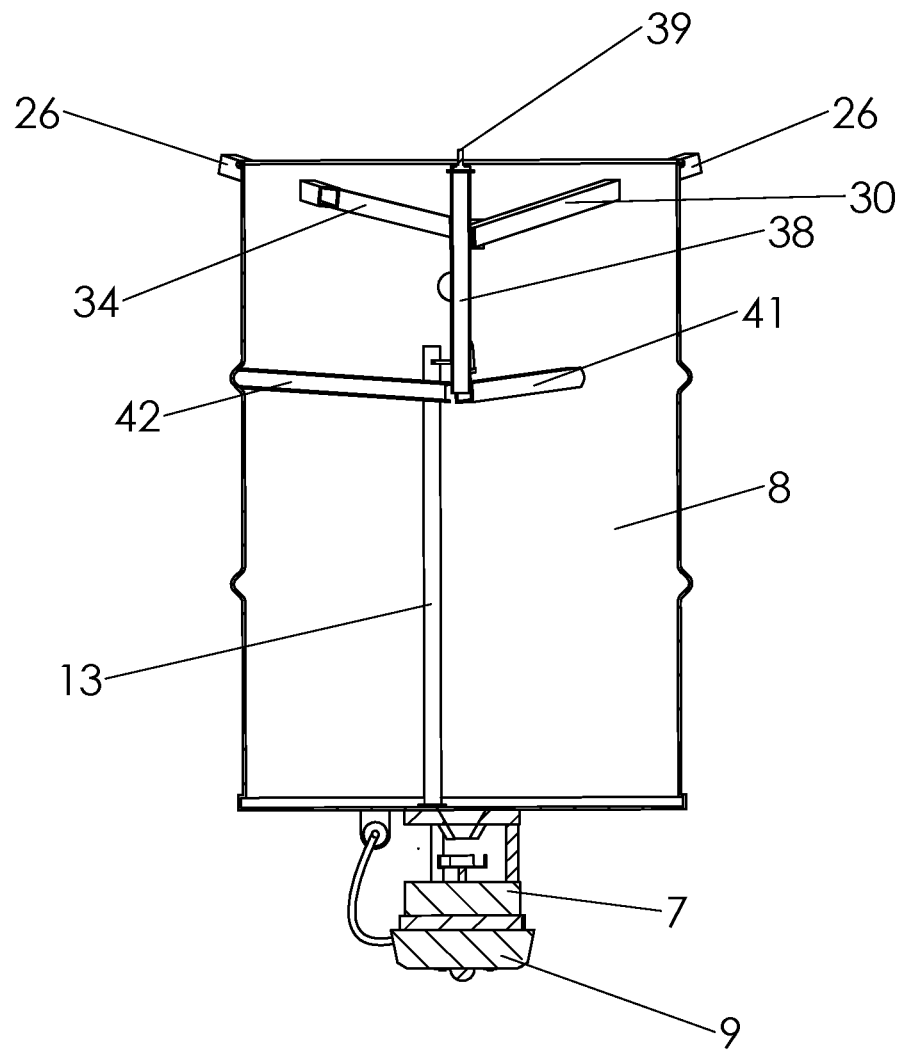
FIG. 14 is a section view of the feeder assembly of the present invention taken from the section line shown in FIG. 11.
Figure 15:
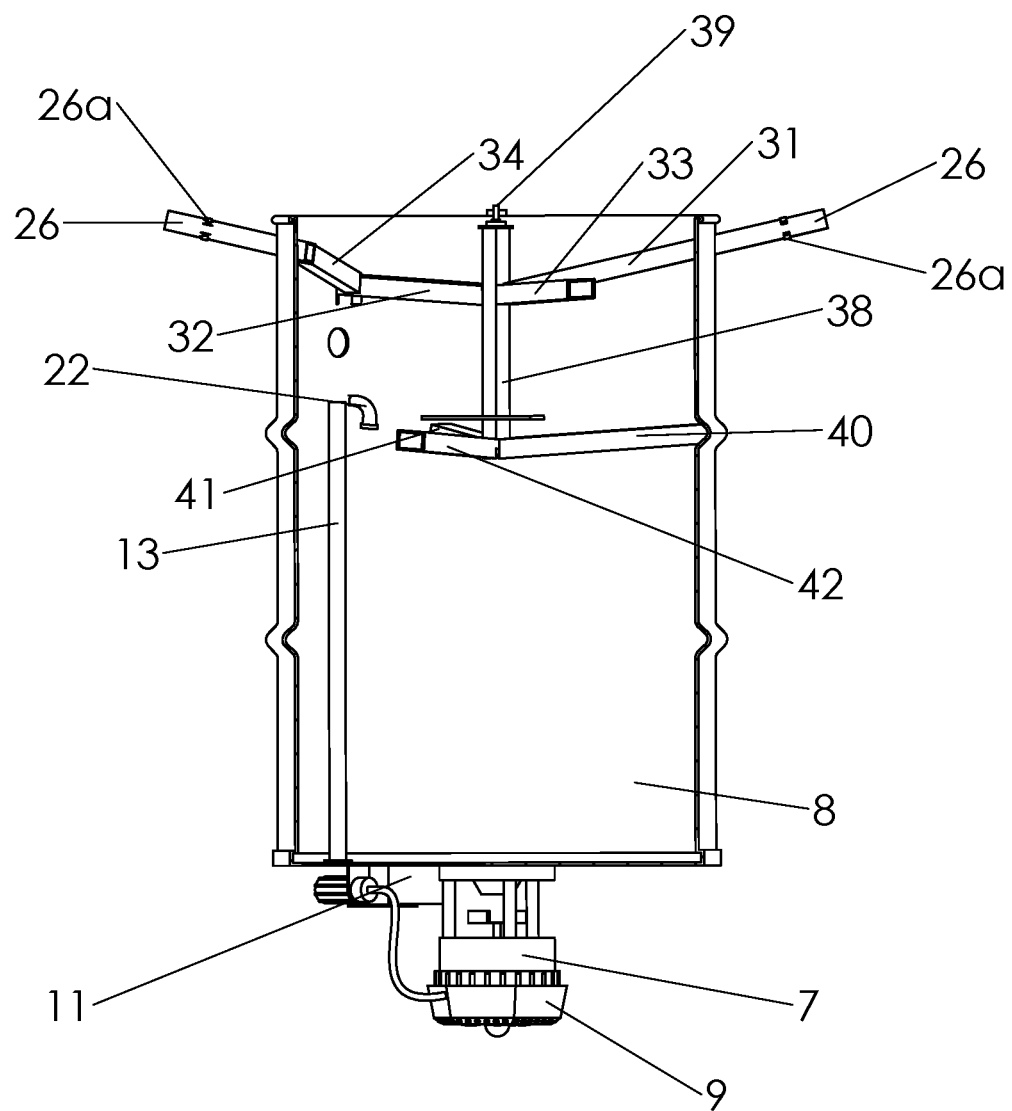
FIG. 15 is a section view of the feeder assembly of the present invention taken from the section line shown in FIG. 11.

FIGS. 11A and 11B are top views of the feeder assembly of the present invention shown with the lid, waterproof cover, battery and battery platform removed. FIG. 11A includes the pertinent reference numbers, and FIG. 11B shows the relevant angles. The primary solar panel has also been removed from this figure for clarity. This figure clearly shows the orientation of the upper and lower interior frameworks of the interior framework relative to the center post. 38. The first and second arms 30, 31 are disposed about the center post 38 with ninety degrees (90°) between them. Similarly, there are ninety degrees (90°) between the first arm 30 and the seventh arm 36 and ninety degrees (90°) between the second arm 31 and the eighth arm 37. There are forty-dive degrees (45°) between the first arm 30 and the third arm 32 and forty-five degrees (45°) between the second arm 31 and the fourth arm 33. The ninth, tenth and eleventh arms 40, 41, 42 are equally spaced (or evenly disposed) about the center post 38, with one hundred twenty degrees (120°) between them. FIGS. 12-15 provide section views that further illustrate the various angles of the interior framework.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A lighted pig feed dispersal apparatus comprising:
 (a) a frame;
 (b) a platform;
 (c) a feeder assembly;
 (d) a feeder light;
 (e) a solar panel;
 (f) a battery;
 (g) four motion sensor lights;
 (h) four arm supports; and
 (i) four extension arms;
 wherein the frame is comprised of four legs, each of which has a distal end and a proximal end, and wherein the proximal end of each leg is attached to the platform;
 wherein the feeder assembly is situated in a center of the platform;
 wherein the feeder assembly comprises a barrel;
 wherein the feeder light is situated underneath the barrel;
 wherein the solar panel is configured to power the feeder light;
 wherein the battery is situated inside of a top part of the barrel;
 wherein the motion sensor lights extend outwardly from the top part of the barrel,
 wherein the four arm supports extend outwardly from a side wall of the barrel and are disposed about a perimeter of the top of the barrel;
 wherein the four extension arms are configured to slide onto the four arm supports;
 further comprising an interior framework;
 wherein the interior framework comprises an upper interior framework and a lower interior framework:
  wherein the upper interior framework is comprised of a first arm, a second arm, a third arm, a fourth arm, a fifth arm, a sixth arm, a seventh arm, and an eighth arm, each of which has a distal end and a proximal end;
  wherein the proximal ends of the first arms are joined to a center post that extends vertically from a bottom of the interior framework to a top of the interior framework;
  wherein the first and second arms extend upwardly from the center post at a first angle, pass through the side wall of the barrel, and become first and second arm supports;
  wherein the third and fourth arms extend upwardly from the center post at a second angle and terminate at the side wall of the barrel;
  wherein the distal end of the third arm is joined to the proximal end of the fifth arm, and the distal end of the fourth arm is joined to the proximal end of the sixth arm;
  wherein the fifth arm extends from the distal end of the third arm at a third angle, and the sixth arm extends from the distal end of the fourth arm at the third angle;
  wherein the distal end of the fifth arm is joined to the proximal end of the seventh arm and the distal end of the sixth arm is joined to the proximal end of the eighth arm; and
  wherein the seventh arm extends from the distal end of the fifth arm at a fourth angle, passes through the side wall of the barrel, and becomes a third arm support, and wherein the eighth arm extends from the distal end of the sixth arm at the fourth angel, passes through the side wall of the barrel and becomes a fourth arm support;

wherein the lower interior framework comprises a ninth arm, a tenth arm, and an eleventh arm, each of which has the proximal end and a distal end, and each of which is disposed radially about the center post, with a proximal end of each of the ninth, tenth and eleventh arms joined to the center post;

wherein the ninth, tenth and eleventh arms extend outwardly from the center post at an angle that is equal to the first angle of the upper interior framework; and wherein the distal ends of the ninth, tenth and eleventh arms terminate at an interior of the side wall of the barrel; and wherein the lower interior framework is situated below the upper interior framework.

2. The lighted pig feed dispersal apparatus of claim 1, wherein the first angle is approximately twenty degrees.

3. The lighted pig feed dispersal apparatus of claim 1, wherein the first angle is equal to the sum of the second, third and fourth angles.

4. The lighted pig feed dispersal apparatus of claim 1, wherein the fifth and sixth arms are situated on either side of the battery.

5. The lighted pig feed dispersal apparatus of claim 1, wherein the entire interior framework is situated in a top one-third of an interior of the barrel.

6. The lighted pig feeder dispersal apparatus of claim 1, wherein the battery is situated on a battery platform; and
    wherein the battery platform is situated between the upper and lower interior frameworks.

7. The lighted pig feed dispersal apparatus of claim 1, wherein the first and second arms are disposed about the center post with ninety degrees between them measured from a top perspective view;

wherein there is a ninety-degree angle between the first and seventh arms relative to the center post measured from a top perspective view;

wherein there is a ninety-degree angle between the second and eighth arms relative to the center post measured from a top perspective view;

wherein there is a forty-five-degree angle between the first arm and the third arm relative to the center post measured from a top perspective view;

wherein there is a forty-five-degree angle between the second arm and the fourth arm relative to the center post measured from a top perspective view; and wherein the ninth, tenth and eleventh arms are evenly disposed about the center post with one hundred twenty degrees between them relative to the center post measured from a top perspective view.

\* \* \* \* \*